Figure 1:
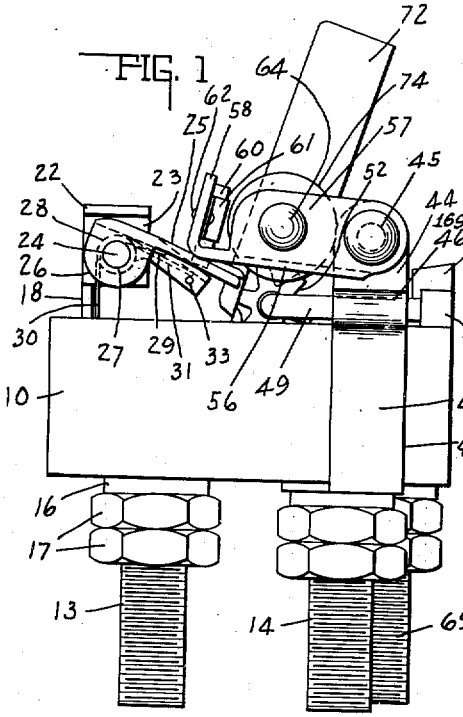

April 4, 1933.

R. H. MAPLE

SELF SOLDERING CIRCUIT BREAKER

Re. 18,784

Original Filed April 18, 1922 2 Sheets-Sheet 1

INVENTOR.

ROY H. MAPLE.

BY

ATTORNEYS.

R. H. MAPLE

April 4, 1933 SELF SOLDERING CIRCUIT BREAKER Re. 18,784

Original Filed April 18, 1922 2 Sheets-Sheet 2

INVENTOR.
ROY H. MAPLE.

BY

ATTORNEYS.

Reissued Apr. 4, 1933

Re. 18,784

UNITED STATES PATENT OFFICE

ROY H. MAPLE, OF INDIANAPOLIS, INDIANA, ASSIGNOR, BY MESNE ASSIGNMENTS, TO I-T-E CIRCUIT BREAKER CO., A CORPORATION OF NEW JERSEY

SELF-SOLDERING CIRCUIT BREAKER

Original No. 1,777,888, dated October 7, 1930, Serial No. 555,275, filed April 18, 1922. Renewed November 12, 1928. Application for reissue filed October 3, 1932. Serial No. 636,076.

This invention relates to thermal circuit breakers and the like wherein the circuit is controlled by a thermally operated member, such that upon the passage of a current above a predetermined value, said thermal member is adapted to open the circuit.

The chief object of this invention is to provide a thermal switch of the circuit breaker type with means whereby, in addition to the thermal switch being thermally operative, said switch may also be manually operated.

The chief feature of the invention consists in so associating the manually operated means and the thermally operated means that a simplified and compact switch is secured.

Another feature of the invention consists in the double hinge support of the movable switch member with which is associated the thermally operated means and the manually operated means.

Still a further feature of the invention consists in providing the contact members of the switch with suitable non-pitting and arcing material, such as carbon, whereby the arc formed upon the making and the breaking of the circuit by the switch members will occur between said carbon material and not between the normal contact members.

And still a further feature of the invention consists in suitably insulating the manually operated means from the remainder of the circuit.

Still another feature of the invention consists in providing means whereby one side of the circuit when said switch is open will be grounded through said switch.

Another feature of the invention consists in positioning the two contact members in juxtaposition to each other such that the space between the same may be utilized to receive the thermally and manually operated means.

Another feature of the invention consists in the thermally operated means, which comprises a catch wheel normally secured against movement and movable upon the passage of an overload current through the wheel support.

Another feature of the invention consists in associating advance resistance means with the heat conducting wheel support.

And still a further feature of the invention consists in providing a hollow plated tube support to which the wheel member is soldered, and upon which the wheel member is rotatable upon the passage of an overload current therethrough.

Figure 2:
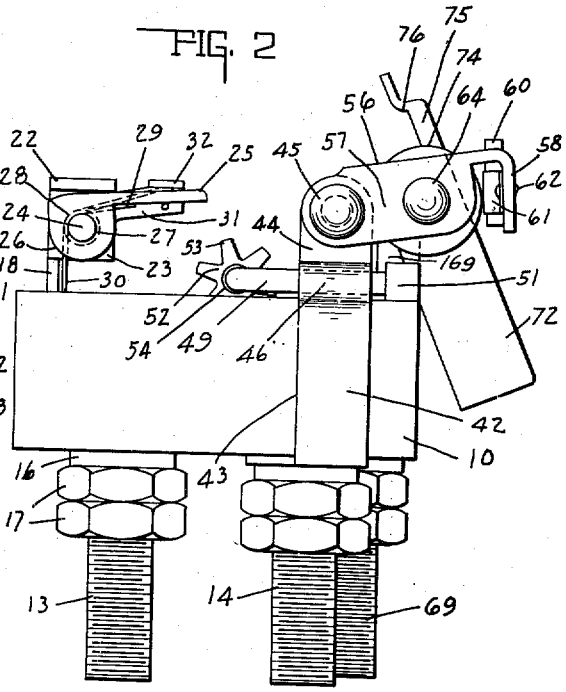
Figure 3:
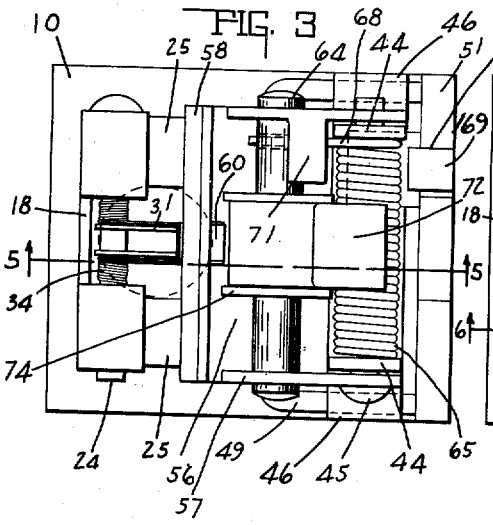
Figure 4:
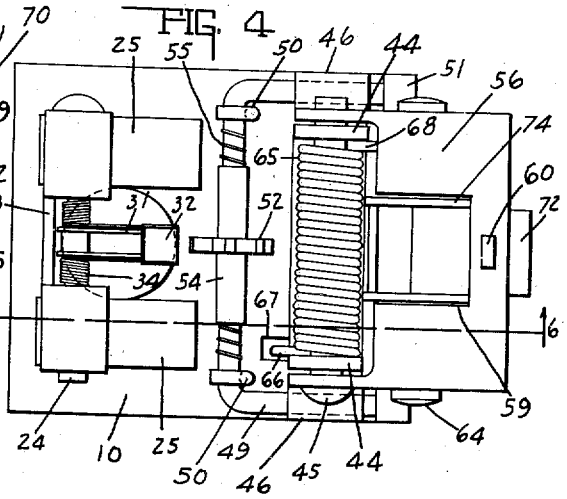
Figure 5:
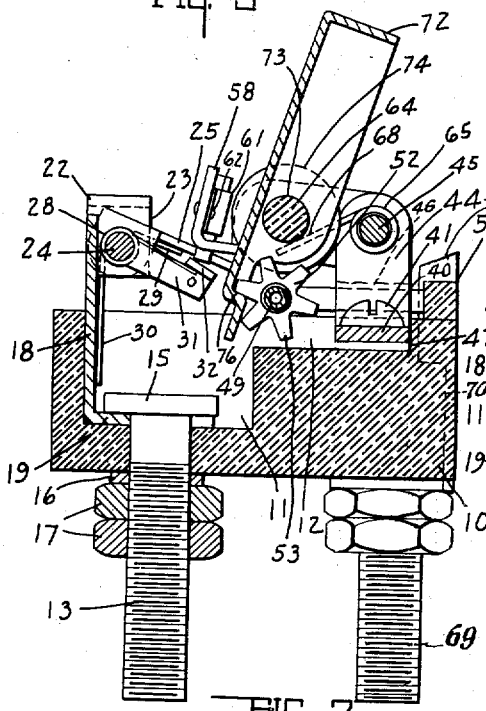
Figure 6:
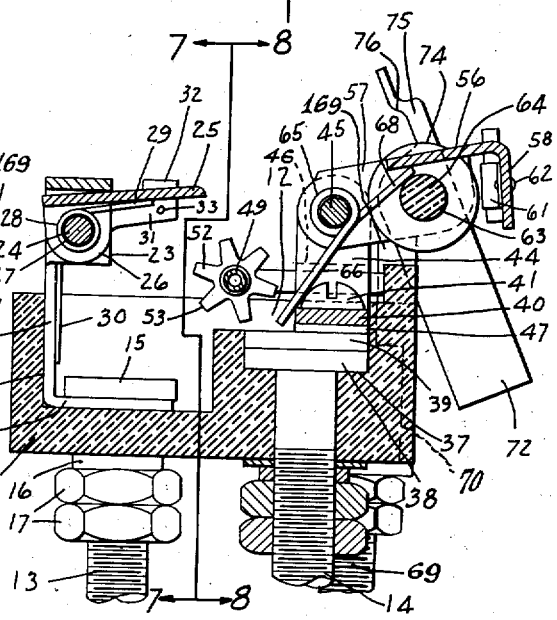
Figure 7:
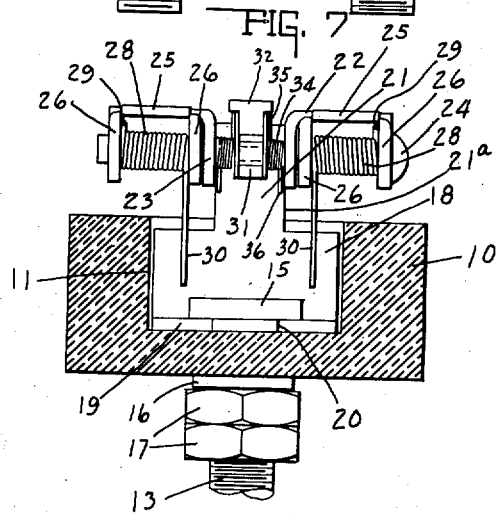
Figure 8:
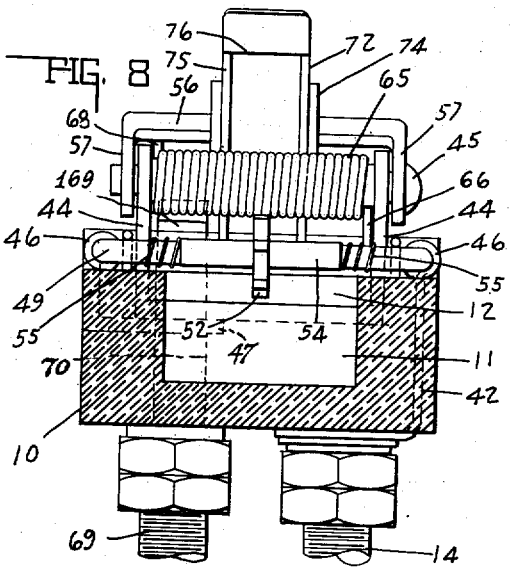

The full nature of the invention will be understood from the accompanying drawings and the following description and claims:

In the drawings, Fig. 1 is a side elevational view of the thermal circuit breaker in the closed circuit position. Fig. 2 is a similar view showing the parts thereof in the open position. Fig. 3 is a top plan view of the circuit breaker in the closed circuit position. Fig. 4 is a similar view of the parts in the open circuit position. Fig. 5 is a central sectional view taken on the line 5—5 of Fig. 3 and in the direction of the arrows. Fig. 6 is a sectional view taken on the line 6—6 of Fig. 4 and in the direction of the arrows. Fig. 7 is a transverse sectional view taken on line 7—7 of Fig. 6 and in the direction of the arrows. Fig. 8 is a similar view taken on the line 8—8 of Fig. 6 and in the direction of the arrows.

In the drawings 10 indicates a suitable base of insulation material, such as fiber, rubber or the like insulation of rectangular outline. The insulation block 10 is provided with a recess 11, and communicating therewith is a channel 12. Suitably secured to and extending through the insulation block 10 are terminal posts 13 and 14, said terminal posts being provided with the usual contact heads 15 and 38 respectively, washer 16 and lock nuts 17. The two terminal posts 13 and 14 are respectively adapted to be connected to the current supplying means and to the load portion of the circuit. A suitable metallic plate member 18 is adapted to be positioned in the recess 11 and lie adjacent one wall thereof. Said plate or standard 18 is provided with an angular base 19 which is suitably slotted at 20 to receive the bolt 13, said standard being secured to said insulation base in the upright position by the head 15 clamping the angular base or bracket portion 19 to the bottom wall of the recess. The width of the member 18, as shown clearly in Fig. 7, cooperates with the side walls of the recess 11 to position the standard 18 in the block 10, so that when the other parts are associated therewith, said standard will be immovably positioned, as well as secured in the exact desired position.

The standard portion 18 is suitably cut away at 21[a]. Upon the upper end of the reduced portion 21, there is provided a pair of transversely and oppositely extending bracket portions 22, and extending at right angles to said bracket portion and inwardly from said reduced portion 21 is a pair of parallel plate portions 23, which plate portions are perforated to receive the bolt member or pivot pin 24.

In the present instance the hinge pin 24 adjacent the brackets 22 and the plates 23 pivotally supports contact members 25 each herein shown in the form of a leaf provided with two parallel and angularly positioned ears 26 suitably perforated at 27 to receive the pivot pin 24. Positioned between the parallel ears 26 is a coiled spring 28, one end 29 of which bears against the leaf portion 25, and the other end 30 of which bears against the upright 18, as shown clearly in Figs. 5, 6 and 7. It will be noted that the contacts are hinged and yieldably supported upon the standard 18 and are in electrical connection therewith by means of the pivot pin 24, as well as the spring ends 30. It will also be understood that the parts 19, 21, 22 and 23 may all be formed angularly with the standard portion 18 by being stamped from a suitable plate or metallic strip and bent into the shape hereinbefore described. This construction also permits that the contact leaves be assembled upon the standard 18, but the same is positioned upon and in the insulation block and secured thereto. Between the plates 23 is a pivotally supported contact supporting member 31, said supporting member includes a pair of parallel plates which are suitably perforated to receive the bolt member 24 so that said contact member is hingedly supported upon the hinge pin 24. The free end of the contact supporting member 31 carries a contact block 32 which is preferably riveted to the same at 33. The contact block 32 is preferably formed of carbon or carbonaceous material; while the contact leaves 25 are preferably metallic. Positioned between each of the plate portions 23 and the contact supporting member 31 is a coiled spring 34, one end 35 of which bears against the free end of the contact supporting member 31, and the other end 36 of which bears against the standard portion 18. Thus, the contact 32 is yieldingly and hingedly supported upon the hinge pin 24, and as shown clearly in Figs. 6 and 7, said contact member, due to the absence of the brackets 22, has a greater arcuate movement about the hinge pin 24 than the contact leaves 25. The brackets 22, it will be noted as shown clearly in Fig. 6, limit the outward arcuate movement of said leaves upon the pin 24; while the arcuate movement of the contact member 31 is limited by the upper edge of the standard portion 21.

The terminal 14 is seated in a hole 37 such that the head 38 thereof is positioned below the level of the recessed portion 39, thereby insulating said head from any metallic parts supported upon the ledge indicated by the numeral 39. Positioned upon the ledge 39 is a plate portion 40 suitably secured thereto by means of a screw or bolt 41, see Figs. 5 and 6. A suitable conducting member, such as the strap portion 42, extends upwardly and is positioned in a groove 43 and terminates adjacent the plate portion 40, but is not connected thereto. The plate portion 40 is provided with two upwardly extending bracket portions 44 which are shown in the form of ears, and pivotally supported by the ears 44 is a hinge pin 45 carrying the movable portion of the circuit breaker, as well as the latching means therefor. The upwardly extending strap or conducting bar 42 terminates adjacent the top of the insulating block 10 in a curved portion forming a cylindrical housing 46. As shown clearly in Figs. 5 and 6, a plate portion 47 is positioned beneath the plate portion 40 and is in electrical contact therewith, and said plate portion terminates in a similar cylindrical housing 46. Said cylindrical housings 46 are adapted to receive a suitable conducting member such that the terminal post 14 will be electrically connected with the supporting plate 40 and the ears 44, whereby current will be conducted therethrough to the movable contact means supported by said ears and the bolt 45.

As shown clearly in Figs. 2, 4, 6 and 8, the conducting member 49 is composed in the present instance of a round hollow U-shaped member, the free ends of which are receivable by the cylindrical housings 46, and the inward movement of said free ends is limited by the stop pins 50, see Fig. 4. If desired, other stop means may be provided such as the ledge portion 51 against which the free ends of the conducting member are adapted to abut, said ledge being shown integral with the insulating block 10. Associated with the intermediate or central portion of the conducting strip 49 is a star wheel or catch wheel 52 provided with a plurality of catching projections or teeth 53 and an elongated supporting hub 54. Associated with the hub and concentric with the conducting member 49 is a pair of coiled springs 55, which springs are adapted to maintain the star wheel and hub member medianly when said star wheel is freely rotatable upon said conducting member. In the present invention the conducting member 49 is suitably plated with some suitable metal, preferably one which oxidizes with difficulty, such as tin or silver and the like, and positioned between the hub portions and the plated conducting member is suitable soldering material, whereby upon the passage of an electric current through said conducting member, which current is sufficiently great to heat said soldered material, said wheel will be freely rotatable upon said conducting member 49 until such time as the soldering material has reset and again secured the star wheel to the conducting member. The springs 55, during said melted condition of the solder and rotatable condition of the wheel, are adapted to maintain said wheel in the desired position.

In the present invention there is hingedly supported upon the bolt 45 a contact plate member 56, which contact plate member is provided with the side portions 57, the free ends of which are perforated and through which extends the bolt 45. The contact plate member 56 is provided with an upwardly extending flange portion 58. Plate member 56, as shown in Fig. 1, is adapted to engage the contact leaves 25. As shown clearly in Fig. 4, the plate 56 is slotted at 59, and adjacent said slot is positioned a contact member 60 which projects therefrom as illustrated in Fig. 2. Said contact member 60 is secured to the plate by a suitable bracket 61 riveted at 62 to the apron portion 58. Thus, as shown in Figs. 1 and 5, the plate member 56 is adapted to engage the leaves 25, while the preferable carbon contact 60 is adapted to engage the carbon contact 32. As shown clearly in the before mentioned figures and also from the analysis of Fig. 6, it will be noted that the two carbon contacts are engageable before the plate member and leaves engage each other, and said carbon contacts remain in engagement with each other after said plate member and leaves have disengaged from each other, thereby providing that any arc formed when the circuit is opened by the circuit breaker will be received upon the carbon contacts, thus preventing pitting of the metallic contact portions and the other results such as usually occur.

The side portions 57 are preferably perforated at 63, and in the present instance said perforations are adapted to receive an insulating pin member 64, which pin member may be of fiber material if desired. Concentric with the pivot bolt or pin 45 is a coiled spring 65, one end 66 of which is seatable in a slit 67 formed in the insulation base, and the other end 68 of which is positioned adjacent the bearings upon the insulating pin 64. Thus, when the contacts are released from engagement with each other, the plate 56 will be swung from the position shown in Fig. 1 to the position shown in Fig. 2.

Associated with the circuit breaker is means for grounding the load side of the circuit. Said means in the present instance comprises a terminal post 69 positioned in a slot 70 formed in the insulation base 10 and securing a contact 169. Projecting transversely of the flanged portion 57 and parallel to the plate portions 56 and inwardly, in the present instance, is a contact member 71, said contact member being adapted to engage the contact 169 when the plate 56 is in the position shown in Figs. 2 and 6. Thus, the circuit connected with the terminal post 14 will be grounded through the contact 169, the circuit being through the following members; the strip 42, the housing 46, the thermal conductor 49, the other housing 46, plate 47, support 40, hinge 44, bolt 45, flange 57 and contact member 71. It will be thus noted that the plate 56, side and hinge forming flanges 57, the apron or flange 58 and contact member 71 are adapted to be formed from a single sheet or strip of metal.

The means for locking the circuit breaker in the closed circuit position and the means for manually releasing the same, which in the present instance may be a single element or its equivalent, is as follows: There is illustrated in the drawings a latching and releasing member 72, which latching and releasing member comprises a body portion substantially channel-shaped. The channel sides of said latching and releasing member are perforated at 73, and through said perforations extend the insulating pin 64. In the present construction suitable insulating washers 74 are carried by the insulating pin and are interposed between the adjacent end of the slot 59 through which said member 72 extends, thereby insulating said member 72 from the plate portion 56. The free end 75 of the member 72 is preferably turned inwardly and forwardly so as to provide a latching notch or projection or ledge 76, which ledge is adapted to engage one of the teeth 53 of the star wheel 52, as shown clearly in Figs. 1 and 5. When thus engaged, it will be noted that the several contact members are in engagement with each other and the switch is in the closed circuit position.

From the foregoing the operation of the device will be readily understood. The circuit is completed from the terminal post 13 to the terminal post 14 by means of the contact leaves 25 and the plate 56, as well as the auxiliary carbon contacts 32 and 60, the switch being held in the closed circuit position by means of the star wheel 52 and the latching member or ledge 76. When the member 72 is manually engaged to release the ledge 76 from engagement with the engaging tooth 53, said switch, under the influence of the spring 65, will spring to the open circuit position, and simultaneously therewith the leaf members 25 and carbon member 32 will be carried to the open circuit position by the respective springs 28 and 34, which positions are clearly shown in Figs. 2 and 6. Similarly, when the circuit is subjected to the passage of a current greater than that for which the circuit is intended, said excess current causes, by means of the conducting member 49, the solder associated with the star wheel 52 to become softened, thereby permitting the star wheel to rotate upon the conducting member and thereby releases the latching ledge 76, which permits the spring 65 to move the plate 56 to the open circuit position.

While the invention has been illustrated as comprised of rigid contact members, it will be understood that said contact members may be yielding in their construction without departing from the broader features thereof.

While the invention has been described in great detail, and several modifications thereof have been disclosed, it will be understood that these modifications and others which will readily suggest themselves to those skilled in the art are all considered to be within the broad purview as outlined by the appended claims.

The invention claimed is:

1. In a thermal circuit breaker, contact means, a movable switch contact, a latch for holding said movable switch contact in contact with said first mentioned contact means, thermally releasable means for releasing said latch, means hingedly supporting said latch upon said movable switch contact, a finger portion included in said latch for manually releasing the same, and additional contact means engageable by the movable switch contact when moved into the open-circuit position.

2. In a thermal circuit breaker, the combination of a pair of parallel supports, a contact pivotally and yieldingly mounted upon each of said supports and mutually engageable, and a thermally operable catch for retaining said contacts in engagement, and releasing said contacts from said engagement when said thermally operable catch is released, said contacts being oppositely and outwardly movable upon their pivotal supports when released.

3. In a device as defined by claim 2, the addition of a manually operable means for releasing said contacts from said engagement.

4. In a circuit breaker, a supporting base, switch contact means supported above said base, movable switch contact means supported adjacent said other switch contact means and in spaced relation with said base, said contact means being movable into and out of engagement to make and break a circuit therethrough, a U-shaped thermal member positioned between said contact means and said base and between said first and second mentioned contact means, the arm portions of said U-shaped member extending parallel to and about the contact member.

5. In a thermal circuit breaker, the combination of a plurality of mutually engageable and hingedly suported contact means, a latch therefor hingedly supported upon one of said contact means, and thermally operable means for releasing said latch.

6. In a thermal circuit breaker, the combination of a plurality of mutually engageable and hingedly supported contact means, a latch therefor hingedly supported upon one of said contact means, thermally operable means for releasing said latch, and means for manually releasing said latch.

7. In a thermal circuit breaker, the combination of a plurality of mutually engageable and hingedly supported contact means, a latch therefor hingedly supported upon one of said contact means, thermally operable means for releasing said latch, and other contact means adapted to be associated with one of said contact means when the circuit therethrough is opened to close a circuit through the other contact means.

8. In a thermal circuit breaker, the combination of a plurality of mutually engageable and hingedly supported contact means, a latch therefor hingedly supported upon one of said contact means, thermally operable means for releasing said latch, other contact means adapted to be associated with one of said contact means when the circuit therethrough is opened to close a circuit through the other contact means, and means for manually releasing said latch.

9. In a thermally operable circuit breaker, the combination of a thermally releasable toothed wheel, a latch therefor normally constrained toward release, a manually engageable circuit closing member supporting said latch, a pair of relatively movable contacts for completing a circuit therethrough when in engagement, said contacts being separable when the latch is thermally released, and a coiled member concentric with the wheel mounting and operatively associated therewith.

10. In a self-soldering circuit breaker, the combination of a relatively stationary but yielding contact, a hingedly mounted contact normally constrained toward open circuit positioning, a catch, and a toothed wheel, said wheel and catch having a releasable connection intermediate the hinge mounting and contact engagement.

11. In a self-soldering circuit breaker, the combination of a relatively stationary but yielding contact, a hingedly mounted contact normally constrained toward open circuit positioning, a catch, a toothed wheel having a releasable connection therewith intermediate the hinge mounting and contact engagement, and a U-shaped current conductor associated with said toothed wheel and arranged for thermal conductivity connection therewith.

12. In a self-soldering circuit breaker, the combination of a relatively stationary but yielding contact, a hingedly mounted contact normally constrained toward open circuit positioning, a catch and tooth wheel having a releasable connection intermediate the hinge mounting and contact engagement, a U-shaped current conductor associated with said toothed wheel and arranged for thermal conductivity connection therewith, the ends of said U-shaped member being detachably mounted and the mid-portion being associated with the wheel.

13. In a self-soldering circuit breaker, the combination of a relatively stationary contact, a hingedly mounted contact normally constrained toward open circuit positioning, a catch and toothed wheel having a releasable connection intermediate the hinge mounting and contact engagement, a U-shaped current conductor associated with said toothed wheel and arranged for thermal conductivity connection therewith, the ends of said U-shaped member being detachably mounted and the mid-portion being associated with the wheel.

14. In a circuit breaker, the combination of a base, a U-shaped thermal element having its legs anchored adjacent their extremities, and having an electrical current passing therethrough from end to end, switch contact members, a conducting support, one of said contact members pivoted on said support for movement in a plane normal to said base, latching structure co-acting with said U-shaped element adjacent its mid-point to restrain said pivoted contact member and releasable by said element when a predetermined current passes through said element, said latching structure when released permitting said pivoted contact member to move to open circuit position, insulating means through which the latching restraint is transmitted for preventing conduction through said latching structure between the movable contact member and said mid-point, and an electrical connection from the extremity of a leg of said thermal element for maintaining it, said pivoted contact member and said support at the same electrical potential.

15. In a circuit breaker, the combination of a base, pivoted contact-carrying means movable in a plane normal to said base, an insulated latch normally retaining said means in circuit closing position, and a U-shaped thermal element having its legs anchored adjacent their extremities and having electric current passing therethrough from end to end, said latch co-acting with said thermal element adjacent its mid-point and releasable by said element when predetermined current conditions exist in said thermal element, the restraint of said contact-carrying means transmitted through the insulation of said latch, said insulation preventing conduction through the latch between said contact-carrying means and said mid-point.

16. In a circuit breaker, the combination of a U-shaped thermal element having its legs anchored adjacent their extremities, and having an electric current passing therethrough from end to end, a movable contact member, a hingedly mounted U-shaped carrier for said contact member electrically connected to one leg of said thermal element, a second contact member engageable by said movable contact member, an insulated latch adjacent the midpoint of said thermal element and releasable thereby when a predetermined current condition exists in said element, connections between said latch and said carrier by means of which the contact member on said carrier is moved to open circuit position when said latch is released, and a pair of terminals one of which is electrically connected to the second leg of said thermal element and the other of which is electrically connected to said second contact member.

17. In a circuit breaker, the combination of a U-shaped thermal element having its legs anchored adjacent their extremities, and having an electric current passing therethrough from end to end, said legs being substantially parallel, switch contact members, and an insulated latch adjacent the midpoint of said U-shaped element and releasable thereby when a predetermined current passes through said element, said latch when released permitting said contact members to move to open circuit position.

18. In a circuit breaker, the combination of a movable contact member, a hingedly mounted U-shaped support therefor, a spring mounted between the legs of said U-shaped support and normally urging the same to circuit opening position, a latch normally restraining said movement, and a thermal element normally restraining said latch and having an electric current passing therethrough but adapted to release said latch when predetermined current conditions exist in said thermal element.

19. In a circuit breaker, the combination of a U-shaped thermal element having its legs anchored adjacent their extremities, and having an electric current passing therethrough from end to end, switch contact members, a latch member engaging said thermal element adjacent its midpoint and releasable thereby when predetermined current conditions exist in said element, and a movable support for said latch member insulated therefrom and connected to said contact members for moving the same to open circuit position when said latch is released.

20. In a thermal circuit breaker, the combination of a thermal element having an electric current passing therethrough, a contact member, a hingedly mounted U-shaped carrier for said contact member, and a latch hingedly supported between the legs of said carrier and normally cooperating with said thermal element to retain said carrier and contact member in closed circuit position but releasable by said thermal element when predetermined current conditions exist therein.

21. In a thermal circuit breaker, the combination of a thermal element having an electric current passing therethrough, a contact member, a hingedly mounted U-shaped carrier for said contact member, and means hingedly attached to said carrier between the legs thereof normally cooperating with said thermal element to retain said carrier and contact member in closed circuit position but releasable by said thermal element when predetermined current conditions exist therein.

22. In a thermal circuit breaker, the combination of a thermal element having an electric current passing therethrough, a contact member, a hingedly mounted carrier for said contact member, and means hingedly attached to said carrier between the hinged mounting thereof and the contact member normally cooperating with said thermal element to retain said carrier and contact member in closed circuit position but releasable by said thermal element when predetermined current conditions exist therein.

23. In a thermal circuit breaker, the combination of an insulated base, a U-shaped thermal element having its legs anchored on said base and extending substantially parallel therewith, a contact element, and means connected to said contact element and normally cooperating with the mid-point of said thermal element to retain said contact element in closed circuit position but releasable by said thermal element when predetermined current conditions exist therein.

24. In a circuit breaker, the combination of a U-shaped thermal element having its legs anchored adjacent their extremities and having an electric current passing therethrough from end to end, a movable contact member, means biasing said member toward open circuit position, a support upon which said movable contact member is hingedly mounted, said support and movable contact member being permanently electrically connected to the anchored extremity of one leg of said thermal element, a second contact member engageable by said movable contact member, latching structure comprising a pivoted member co-acting with said thermal element adjacent its mid-point to restrain said biasing means and releasable by said element when a predetermined current condition exists in said element, the restraint of said contact-biasing means transmitted through insulation electrically interposed between said mid-point and said movable contact member, said latching structure when released freeing said biasing means to move said movable contact member to open circuit position when released, and a pair of terminals, one of which is electrically connected to the anchored extremity of the second leg of said thermal element and the other of which is electrically connected to said second contact member.

25. In a thermal circuit breaker, the combination of a U-shaped thermal element having an electric current passing therethrough from end to end, a hingedly mounted contact carrier, a contact member carried thereby, a second contact member adapted to cooperate with said first contact member for closing an electric circuit, and a latch construction cooperating with the midpoint of said thermal element normally retaining said contact members in closed circuit position, but permitting the same to move to open circuit position when predetermined current conditions exist in said thermal element, said latch construction being connected to said contact carrier between the hinged mounting thereof and the contact member carried thereby, and the portion of said latch construction cooperating with said thermal element being insulated from said contact members.

26. In a thermal circuit breaker, the combination of a U-shaped thermal element having an electric current passing therethrough from end to end, cooperating contact members relatively movable to open and closed circuit positions, and a latch construction mechanically connected to one of said contact members and cooperating with the midpoint of said thermal element to normally retain said contact members in closed circuit position but permitting the same to move to open circuit position when predetermined current conditions exist in said thermal element, the portion of said latch construction cooperating with said thermal element being insulated from said contact members.

27. In a thermal circuit breaker, the combination of a thermal element, cooperating contact members relatively movable to open and closed circuit positions, a channel-shaped contact carrier for one of said contact members, and a latch construction having a pivotal connection with the sides of said channel-shaped carrier and cooperating with said thermal element to normally maintain said contact members in closed circuit position but permitting the same to move to open circuit position when predetermined current conditions exist in said thermal element.

28. In a thermal circuit breaker, the combination of a base, a thermal element, cooperating contact members relatively movable to open and closed circuit positions, and a latch construction mechanically connected to one of said contact elements and cooperating with said thermal element to normally retain said contact members in closed circuit position but releasable when predetermined current conditions exist in said thermal element to permit movement of said contact members to open circuit position, the portion of said latch construction cooperating with said thermal element moving outwardly away from said base when released.

29. In a thermal circuit breaker, the combination of a base, a thermal element, cooperating contact members relatively movable to open and closed circuit positions, and a latch and carrier construction pivotally connected to said base at one end and mechanically connected to one of said contact elements, a portion of said construction cooperating with said thermal element to normally retain said contact members in closed circuit position but releasable when predetermined current conditions exist in said thermal element to permit movement of said contact members to open circuit position, and said construction moving outwardly away from said base when released.

30. In a thermal circuit breaker, the combination of a U-shaped thermal element having an electric current passing therethrough from end to end, cooperating contact members relatively movable to open and closed circuit positions, and a latch construction mechanically connected to one of said contact members and cooperating with the midpoint of said thermal element to normally retain said contact members in closed circuit position but permitting the same to move to open circuit position when predetermined current conditions exist in said thermal element, the portion of said latch construction cooperating with said thermal element being insulated from the remainder thereof.

In witness whereof, I have hereunto affixed my signature.

ROY H. MAPLE.